Dec. 13, 1938.   C. W. McKONE   2,139,840
PROCESS OF MAKING PNEUMATIC TIRES
Filed June 6, 1936   2 Sheets-Sheet 1
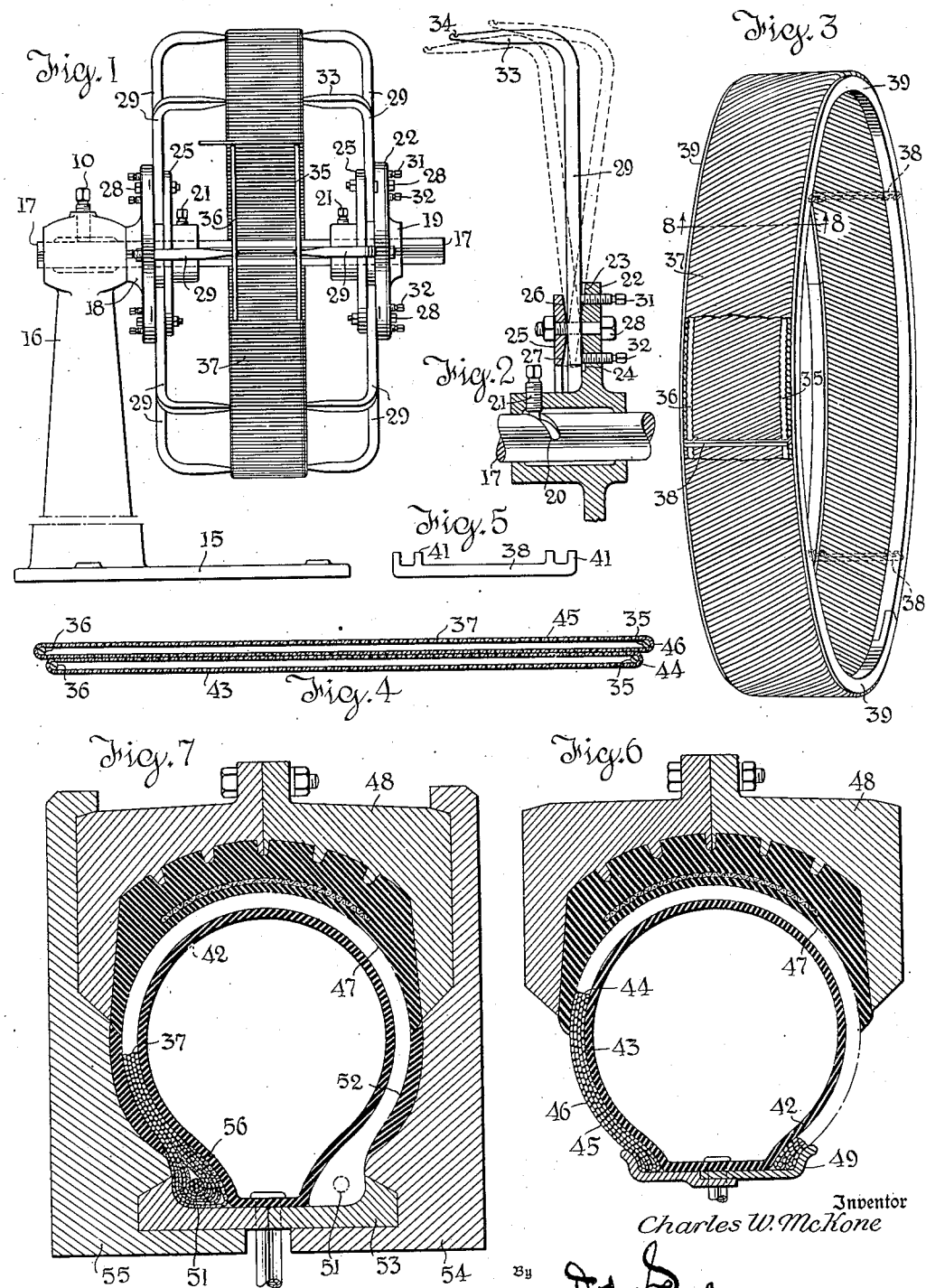
Inventor
Charles W. McKone
By
Attorneys Dec. 13, 1938.  C. W. McKONE  2,139,840
PROCESS OF MAKING PNEUMATIC TIRES
Filed June 6, 1936 2 Sheets-Sheet 2
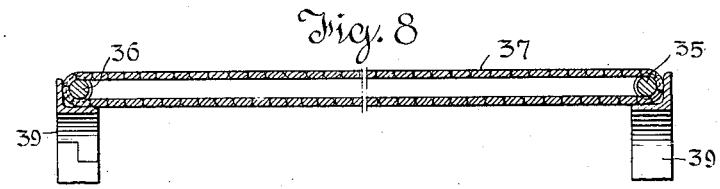
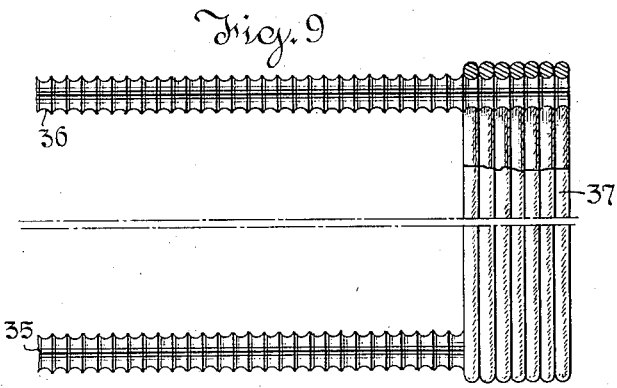
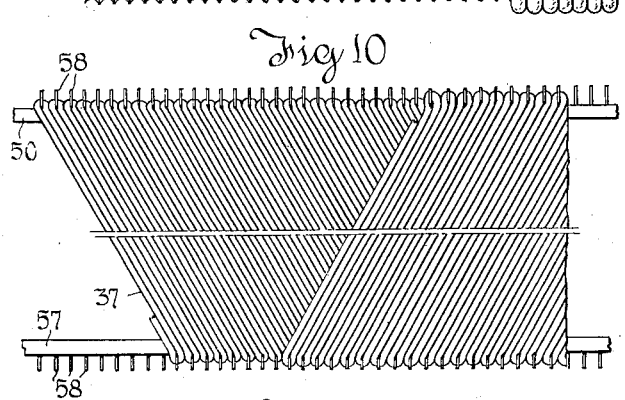
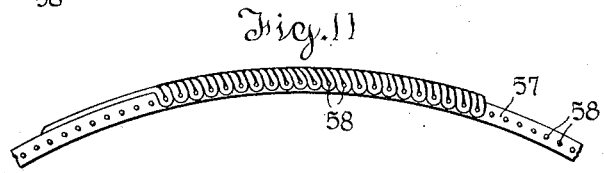
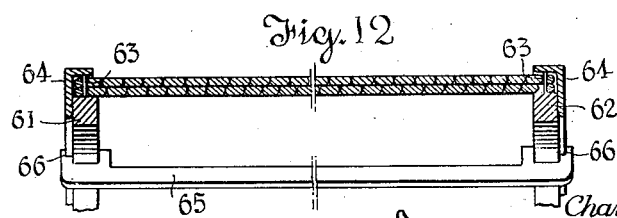
Inventor:
Charles W. McKone
By Dodge and Sons
Attorneys Patented Dec. 13, 1938

2,139,840

UNITED STATES PATENT OFFICE 2,139,840

PROCESS OF MAKING PNEUMATIC TIRES

Charles W. McKone, Washington, D. C.

Application June 6, 1936, Serial No. 83,999

16 Claims. (Cl. 154—14)

This invention relates to a process of making pneumatic tires, and particularly tires of the type known in the art as cord tires, although the principles of the invention may be applied to tire-making in general.

With the rapid advance which has been made in recent years in refinements relating to automotive vehicles, it has been difficult to obtain tires capable of withstanding safely the destructive forces brought to bear on the tires of high-speed automotive vehicles.

An intensive and prolonged consideration of tire failures, together with careful examination of tires which have failed, has led to the conclusion that a substantial portion, if not a majority of tire failures, result from the fact that the cord embodied in the finished tires is not capable of stretching to the extent which it should, in comparison to the cord material before it is incorporated in the tires. That is, the manufacturing steps reduce the elongation or stretch of the cotton so much that the cords of the finished tire are stretched very near to the breaking point. Hence, when the tires are flexed unduly in service, this breaking point is exceeded and the cords are broken. In other words, the treatment to which the cords are subjected in producing the finished tires results in a material decrease in the amount of elongation to which the cord can be subjected, without exceeding its breaking point.

Accordingly, I propose to improve the qualities of cord tires by preserving to a marked degree the elongation properties of the cotton which is embodied in the tire, either by shrinking this cotton before it is incorporated in the tire or preserving its inherent properties during the tire making process, so that the elongation of the cord in the finished tire compares very favorably with the elongation of the cotton cord previous to its being placed in the tire.

In the prior art, a few sporadic attempts have been made to accomplish this end, but so far as I am aware, these processes have all failed commercially because of lack of appreciation of all the factors involved. For example, it has been proposed to make a fabric tire by soaking the cotton fabric in water in order to shrink it before building the tire carcass, and then to form the carcass, dry it and subsequently apply a rubber coating. Another proposal has been suggested for use in making cord tires. It consists in treating the cotton stock with rubber in the usual way, and then building up a tire carcass and shaping it, and finally immersing the formed carcass in water in order to shrink the cords before vulcanizing the tire. This proposal is, of course, impractical because rubber-impregnated cords cannot be shrunk satisfactorily, nor can the moisture be removed from the tire when it is incorporated in this manner.

The main object of this invention is to so build a tire that the natural elongation properties of the cords are preserved, and the use of all heavy and expensive calendering apparatus is entirely avoided. The process not only eliminates the preparation of the impregnated or calendered cord, but it makes calendering unnecessary. It also makes bias-cutting unnecessary, eliminates preparation of the so-called pockets and avoids all waste which has always been a necessary element of the forming of the beads in known methods as they have been practiced heretofore.

Numerous other objects and advantages of the invention will appear from the following description when read in connection with the accompanying drawings, in which:—

Figure 1 is a view in elevation of one form of apparatus which may be used in carrying out processes embodying this invention;

Fig. 2 is a detail sectional view showing one of the bead supporting members which is used in the machine shown in Fig. 1.

Fig. 3 is a perspective view of the cord structure as it appears subsequent to its formation on the apparatus shown in Fig. 1, and previous to its impregnation or shaping;

Fig. 4 is a sectional view showing an assembly of four plies of cords and consisting of two cylinder elements such as shown in Fig. 3;

Fig. 5 is a detail view of one of the struts shown in Fig. 3.

Fig. 6 is a sectional view illustrating the manner in which the two cord cylinders, such as are shown in Fig. 3, are expanded to form a tire carcass;

Fig. 7 is a view similar to Fig. 6, but showing the four-ply tire in a vulcanizing mold and illustrating the uniform symmetrical arrangement of the plies at the bead of a tire made according to this process;

Fig. 8 is a section on line 8—8 of Fig. 3;

Fig. 9 is a detailed plan view of a fragment of the bead supports with a few cords wound thereon;

Fig. 10 is a plan view of a portion of a modified bead support construction in which the cords are laid diagonally instead of straight;

Fig. 11 is a side view of the construction shown in Fig. 10; and

Fig. 12 is a section similar to that of Fig. 8, but illustrating the bead supports as having pins placed on their peripheries and held in place by rings to permit shaping of the tire without disarranging the cords.

The process embodying my invention, briefly stated, consists in building up a tire carcass from cotton cord which has been shrunk by saturation with water, by impregnation with rubber, or treatment with a solution of starch in water, dextrine or a similar material, or containing merely the usual 5 to 6½ per cent of moisture which it will normally absorb from the atmosphere, and applying it to a pair of properly spaced supports or rings carried by apparatus similar to that shown in Fig. 1. The essential point is that the elongation of the cotton be preserved to the fullest possible extent. This can best be carried out by pre-shrinking the cords and then building the tire carcass without subjecting the cords to any substantial elongating stresses.

The cords may be wound in position by any suitable standard type of winding machine, and the apparatus of Fig. 1 is preferably provided with some known type of indexing mechanism to space the cords properly as they are being wound in position, and to make it unnecessary to move the winding apparatus. When a complete turn of cords has been made on the supports, one of these supports is rotated through a sufficient angle with respect to the other, to produce the desired angularity of the cord structure. Simultaneously with the rotation or turning of the one support, this support will be moved closer to the other, to avoid placing any elongating stress on the cords as they lie across the two forming or bead supports.

One form of apparatus which may be employed for carrying out preliminary steps of the process of this invention is shown in Fig. 1. The essentials of this structure are two supports which can be fixed in position and rotated relatively and at the same time moved toward one another.

As shown in Fig. 1 the apparatus comprises a base 15 carrying an upstanding pedestal or support 16. Journaled in the upper portion of this pedestal is a shaft 17 secured in position by suitable locking means such as a set screw 10. Adjustably mounted on the shaft 17 and capable of rotational or axial movement thereon, are two heads 18 and 19. These two heads may be of identical construction and may comprise a body portion adapted to be secured to the shaft 17 in any desired position by locking means such as set screws 21. The inner ends of screws 21 work in curved cam slots 20 in shaft 17. The body of each of these members carries a projecting flange 22 having on one face two intersecting annular cambered surfaces 23 and 24. Attached to and capable of adjustment toward and away from the flange 22 is a ring 25 also having cambered surfaces 26 and 27 cooperating with the cambered surfaces on flange 22. The ring 25 is secured in fixed relation to the flange 22 by means of bolts 28. Clamped between the flange 22 and the ring 25 of each of the heads are a plurality of spaced L-shaped supports 29. The longer ends of these supports cooperate with the cambered surfaces and are adapted to be clamped between the ring 25 and the flange 22. By adjustment of set screws 31 and 32 associated with each of the members 29, the angular relation of the members 29 may be varied with respect to the heads, and the diameter of the supporting structure varied.

The L-shaped supports 29 each have a shorter axially projecting portion 33 terminating at its free end in a hook 34. These hooks are made of suitable configuration so as to engage and hold supports 35 upon which the cords are wound in the preliminary step of forming the tire carcass. The supports will preferably be metal rings having means such as grooves, pins or the like, for guiding the cords laid or wound thereon into proper position. While these supports are shown in the form of rings which are grooved or carry pins, it will be understood that other forms of supports may be found suitable and are within the scope of this invention.

In building a tire by the use of this apparatus, the two heads 18 and 19 are secured in properly spaced relation with two supports 35 and 36 held in the hooks 34. The spacing of these supports is determined by the size of the tire which is to be constructed. Cotton cord is now wound about the supports 35 and 36 with the separate cords 37 passing substantially straight across from one support to the other and parallel to the axes of the supports. The cord is preferably pre-shrunk by impregnation with rubber and then drying, or by soaking in water, or by soaking in a cold starch solution (e. g. 1 percent of starch in water) or soaking in a dextrin or similar solution.

It is well known that cotton shrinks when it is wet and stretches when dry, and also that rubber will not adhere to wet cotton. Consequently, it becomes feasible to practice this process by using bare cord containing the normal five to six and one-half percent of moisture which it will absorb from the atmosphere. It will be found desirable then, to carry out this process in a closed room in which the temperature and relative humidity are controlled so as to give the cotton the most desirable moisture content and to maintain it uniform regardless of changes in weather conditions. When moist or wet cords are wound on a grooved support, as shown in Fig. 9, the cords will flatten on their lateral sides. This permits close winding with resultant increase in the number of cord ends per unit of area.

It should be pointed out that when the cords are wound while in a moist condition, they must be dried before impregnation. The drying may, however, be deferred until after shaping. Where water alone is present in the cord it may be removed by simple drying. Rubber impregnated cord may also be conditioned by simple drying. If a cold starch solution is used as a moistener, hot water, or other solvent, must be employed to remove the starch before the drying and subsequent steps can be performed. Dextrin or other shrinking agent used will, likewise, have to be removed by a suitable solvent before the drying can be accomplished.

When the cord has been shrunk with starch solution, dextrin or water, and has been suitably treated to remove the shrinking agent and dried ready for impregnation, it will be found to be advantageous to treat the cord with a fluffing agent to open the pores of the cotton and assist in the subsequent impregnation. A suitable agent is alcohol such as amyl, butyl, benzyl or propyl alcohol. Alcohol has the property of causing the cotton to swell and helping the impregnating agent to penetrate readily and deeply into the cord structure. Other fluffing agents than alcohol known in the textile art as "carrying agents" may also be used to advantage.

In practice it may be found desirable to provide the heads 18 and 19 with suitable indexing mechanism for obtaining proper and accurate registry between the cord which is being wound and the supports or rings 35 and 36. Any standard form of winding machine may be utilized for placing the cords in position across the rings. When the cord has been wound entirely about the rings 35 and 36 so that two complete annular layers or plies are in position, the ends are secured in place and one of the heads, for example 19, rotated with respect to the other until the cords 37 have the desired angular relation which they are to occupy in the finished tire. As this rotation of head 19 is performed, the head will be moved toward the head 18 sufficiently to prevent placing the cords under any substantial elongating stress. When this turning or rotation of head 19 is completed, the head will be secured in place again, and steps taken to secure the parts in this adjusted position. The cam groove 20 constitutes a simple means of performing the adjustment of the heads. When the screw 21 in head 19 is loosened, the head may be rotated and will move toward head 18 a distance determined by the extent of the groove.

After rotating the head 19 to give the cords a desired angularity the supports must be clamped into spaced relation. One manner in which this may be accomplished is by inserting struts 38 between the bead wires at spaced intervals therearound. Each of these struts is forked, as shown in Fig. 5, at both ends for engagement with the bead supports while the body of the strut is offset. In practice, three or four struts may be found to be sufficient for accomplishing the purpose.

After the placing of the struts, some means must be utilized for securing the cords in fixed relation to the supports and likewise to prevent the supports from rotating relatively or turning to their original positions. One suitable method of accomplishing this is indicated in Figs. 3 and 8. The apparatus comprises two split rings 39 which are L-shaped in cross section, as shown in Fig. 8. These rings exert outward tension against the inside ply of cords and hold them fixed with relation to the bead supports. These split rings 39 also engage the forked ends 41 of the struts 38 so that the cords 37 are in effect carried by a hollow cylindrical frame.

As soon as the rings 39 are in position, the set screws 31 and 32 may be loosened and the cord cylinder removed from the forming machine. The cord cylinder will then have the appearance indicated in Fig. 3 of the drawings and will be ready for drying and impregnation, or for shaping before either the drying or the impregnation is carried out.

The next step in the process, if a four ply tire is to be made, is to construct a second cord cylinder similar to that shown in Fig. 3, but of suitably larger dimensions so that two of these cylinders may be superimposed concentrically, one upon the other, as indicated in Fig. 4. In this figure, however, the supporting rings and struts have been omitted for the sake of clearness.

When the desired number of cord cylinders have been constructed, and the cord has been prepared for impregnation, the cylinders are placed in an impregnating apparatus ready to be impregnated with any desired rubber compound which is capable of subsequent vulcanization to form a finished tire. The term "rubber compound" used herein is intended to cover any compound containing as a base, the substance rubber, in the form of latex, so-called crude rubber, reclaimed rubber, synthetic rubber or any combination of these ingredients.

The cord cylinders to be impregnated are placed in the impregnating apparatus either before or after the cylinders have been dried. This drying may be carried out by use of a vacuum in the impregnator. When the dry cord is placed in the impregnator, the impregnating liquid is introduced under atmospheric pressure into the chamber containing the cylinders, or pressure greater than that of atmosphere may be utilized in order to insure that the liquid will penetrate all of the pores of the cord. While it is indicated here that the drying of the cord cylinders is carried out just prior to the impregnation step, it will be obvious that the sequence of steps can be varied. For example, (1) the cord cylinders may be dried while the cords are straight, and then the bead rotated and the cylinder impregnated, or (2) the drying step may be carried out after the rotating of the bead and this drying followed by impregnation, or (3) the desired number of plies may be assembled and shaped, and then dried and impregnated. In any of the sequences given, the impregnation may be repeated to increase the thickness of the rubber on the cord, and the impregnation may be carried out in the manner set forth in Patent No. 1,964,658, granted June 26, 1934.

For purposes of illustration, it will be assumed that shaping is to follow impregnation and that two cord cylinders, as shown in Fig. 3, have been completely impregnated. If, for example, the tire into which they are to be incorporated is to have four plies, these two cylinders will then be superimposed, as shown in Fig. 4. A squeegee of rubber may be interposed between any two adjacent angularly related plies in order to prevent sawing or chafing. If this is to be done the rubber will preferably be extruded from a tubing machine so as to be entirely free from grain. It is also preferable to sprinkle powdered sulphur or similar material on the rubber surfaces which are to come in contact whether or not a squeegee is used. The sulphur acts as a lubricant and permits shifting of the plies over one another during the shaping operations. However, during vulcanization of the tire, the sulphur melts and leaves no undesirable residue in the tire, nor does it detract in any way from proper adherence between the plies of the finished tire.

An expanding bag 42 is laid against the inner circumference 43 of the inside cylinder 44 and then the bag is expanded and shaped, as indicated in Fig. 6. It will be observed that during this expanding operation the outer circumference 45 of the larger cylinder 46 is brought against the tread stock 47 already present in a removable mold section 48. In this way, the carcass is accurately centered with respect to the tread, and there never can be any shifting or turning about of these elements after they are once brought into contact. This step of tire manufacture is disclosed and claimed broadly in my co-pending application Ser. No. 62,526, filed Feb. 5, 1936. When the bag 42 is sufficiently expanded a supporting ring 49 will be placed in position against the ends of the plies, as shown in Fig. 6, so that the carcass is now ready for the bead-forming operation.

The plies will now be cut and the supports or rings 35 and 36 removed and bead rings inserted, as shown in Fig. 7 of the drawings. Inasmuch as the parts are formed symmetrically, and the cords are not under tension, there will be absolutely no wastage of material and all cords in each ply will be of almost identical length and condition throughout. Consequently, when the reinforcing strips and other bead elements are in position, as shown in Fig. 7, the plies will be symmetrically positioned with respect to a vertical center line passing through the bead wire 51. After the beads are formed, the side walls 52 will be applied and the mold sections 53, 54 and 55 placed in position, and the tire vulcanized by means of a fluid bag 56 or, preferably, by direct application of curing fluid to the inside wall of the tire.

While it is indicated above that the plies are cut open to remove the supports 35 and 36 and bead rings inserted in forming the beads of the tire, it will be understood that this cutting is not necessary. For example, it may be found preferable to so construct the innermost plies, that is, the two bottom plies in Fig. 4, that the supports or rings 35 and 36 are suitable for use in the finished tire. When these elements are to remain in place they may be covered with the usual rubber or flipper and a coating of a lubricant such as zinc stearate, before the cords are laid. It then becomes possible in forming the beads to leave these rings in place in the inner plies and cut only the outer plies and to fold the outer plies in place around the bead with the usual reinforcing strips or stiffener interposed. The zinc stearate permits relative rotation between the cord and the bead during the shaping operation.

While it is indicated above that only the inner set of bead rings remain in the finished tire, the rings of all plies may be properly constructed to be left in place and superposed to form a dual bead. Such a bead may be finished in the manner already described, without any cutting. All such arrangements are within the scope of the invention.

It may also be advisable in some instances, in order to make the tire free from stress, to make the bead supports of greater diameter than exact dimensioning requires. For example, if a tire is to be made for a rim twenty inches in diameter, the bead supports may be made contractible and have a large diameter of twenty-four inches. The cord cylinder will then have an excess of cord in its structure and shaping of the tire will be simple. The support may be contracted by suitable means, such as a spring, after the cords are laid, to reduce the diameter of the beads to the required twenty inches. Such a procedure will facilitate the placing of the cords and will avoid any possibility of tangling the same during the shaping of the carcass.

The process so far described has included the feature of winding or laying the cords on the bead supports so as to enclose those supports. It will be understood, however, that it is not essential that these supports be enclosed, and in some instances it may even be found desirable to lay the cords in position on the supports by providing the supports with spaced pins as illustrated in Figs. 10 and 11. In those figures, reference characters 56 and 57 designate bead supports having spaced pins 58 on their lateral surfaces. The cords are wound back and forth from one support to the other about these pins while the supports are held, as in Fig. 1. Although the cord 37 is shown as being wound at an angle to the rings, as there is no necessity for turning as in the case previously described, it will be obvious that the cord may be wound parallel to the ring axis and then the bead support rotated as before. The process of Fig. 10 produces one ply at a time. However, since the cords may be wound so that no turning is necessary, each ply may be reversed with respect to the previous one, as shown in Fig. 10, and any desired number of cord plies placed in superposed relation to one another in a single cord cylinder.

In Figs. 10 and 11 it has been indicated that the supporting pins 58 are placed on the lateral faces of the bead supports. Such an arrangement adds somewhat to the difficulties of laying the cords, but simplifies holding them in place. It is practical, however, to place these pins on the peripheries of the bead supports, as shown in Fig. 12.

The bead supports in Fig. 12 are designated 61 and 62. Each support carries on its periphery a series of properly spaced cord-holding pins 63 about which the cords are laid either diagonally or straight, as described in connection with Figs. 10 and 11. After the cords are laid and when they are placed at the desired angle, struts 65 similar to those shown in Figs. 3 and 5 are placed to hold the supports 61 and 62 in properly spaced relation when they are removed from the machine. L-shaped clamping or holding rings 64 preferably composed of two or more hinged sections are secured in place about the supports 61 and 62, and engaging the pins 63 and the sides of the supports. In this way a supported structure similar to that of Fig. 3 results, and the horizontal flanges of rings 64 prevent the cords from slipping off the pins 63 during the shaping or handling of the cylinder after it is removed from the machine. Relative rotation of the supports 61 and 62 is prevented by notching the rings 64 at 66 to receive the forked ends of the struts 65.

The modified constructions of Figs. 10, 11 and 12 relate only to the formation of the cord cylinder and other steps previous to the shaping and impregnation of the carcass. The remainder of the steps may be carried out as described in connection with the method of building shown in Figs. 1 to 9.

In practicing this invention it is preferred that the cord cylinders be impregnated before the shaping operation. Impregnation of a structure such as that of Fig. 8 can be carried out thoroughly and efficiently because the two cord layers are held in spaced relation. Since there is no contact between the sticky rubber-coated surfaces, any required shifting of the layers can be carried out readily. Such shifting of contacting impregnated cord layers is ordinarily very difficult.

If the shaping is performed before the drying and impregnation, and with the cords wet, the expanding will be performed readily because the cords are slippery and will slide over one another easily. When the shaping is carried out at this stage of the process the drying will be accomplished while the cords are in their finished positions in the tire and they will be secured there by the subsequent impregnation.

Obviously, from the above, it will be practical to shape the carcass either before or after impregnation of the cord. Both procedures have advantages and it is within the scope of this invention to proceed in either way. When the schemes illustrated in Figs. 10, 11 and 12 are employed and a squeegee used between adjacent plies to hold them out of contact, the shaping problem is solved regardless of the sequence in which the steps of shaping and impregnating are carried out.

It will be understood that although a four ply tire has been described for purposes of illustration, the process is not limited in any way to that particular number of plies. It is perfectly adapted to making tires having either a greater or a less number of plies, with all the advantages which have been recited.

Whereas in present commercial processes of tire making the elongation of the cord is reduced from about 21 percent in the original cord to about 15 percent in the finished tire, the present process is capable of producing tires in which the elongation of the cord in the finished tire remains at least as high as 17 percent.

The uniformity and freedom from tension of the cord structure in a tire made according to the teachings of this invention may be demonstrated by removing several cords from a certain ply in the finished tire. These cords will be found to be of almost identical length. In tires made according to previous practice, the cords in any one ply may vary considerably in length, and there is a very marked lack of uniformity. This non-uniformity shows that there are present in the tire stresses and strains which make it necessary to cut off much material when the beads are being formed. Tires made according to this invention require no wastage whatsoever in forming the beads.

It will be obvious that the practice of processes embodying this invention avoids the use of calendering apparatus and thus prevents graining of the rubber. It makes preparation of the impregnated or calendered cord unnecessary, as raw rubber compound or latex can be employed for impregnating the cord. It maintains the cords more nearly in their natural unstretched condition than heretofore when incorporated in the finished tire, and eliminates all waste of material during the bead formation. Not only is the finished tire materially cheaper and simpler to manufacture, but it is much stronger than tires built by present processes.

What is claimed is:

1. The method of building a pneumatic tire, which consists in winding cord substantially straight across a pair of spaced parallel annular supports coated with rubber and lubricating means until the supports are enclosed to form a short cylinder, holding one of the supports while the other is rotated through the angle to be imparted to the cords in the finished tire, impregnating and shaping the carcass, applying the coverings to the carcass, and then vulcanizing the tire structure with the original supports forming the bead reinforcing means of the finished tire.

2. The method of building a pneumatic tire, which consists in laying moist bare cord across a pair of spaced parallel rings to form a cylinder of cord, drying and impregnating, expanding and shaping the cylinder of cord to form a carcass, covering the carcass, and then vulcanizing the tire thus formed.

3. The method of building a cord tire having more than two plies, which method consists in constructing a plurality of cylinders of shrunken cords with the cords disposed in angular relation to the bead supports forming the ends of the cylinders, treating the cords with an agent to open the pores, impregnating the cord cylinders, assembling the cylinders in concentric relation, expanding and shaping the cord cylinders to form a plural ply tire carcass, and then covering the carcass and vulcanizing the assembled tire.

4. That method of making a cord tire carcass having more than two plies, which consists in forming cord cylinders by laying pre-shrunken cords substantially straight across pairs of parallel spaced rings coated with rubber and a lubricant to permit the cords to turn thereon, rotating one of the rings of each cylinder with respect to the other ring of the same cylinder, holding said rings in the new angular relation while impregnating the cords with rubber compound, assembling the cylinders in concentric relation, expanding and shaping the superposed concentric cylinders, covering the formed carcass with the original rings present therein and forming the bead rings of the finished tire, and then vulcanizing the structure.

5. The method of building a pneumatic cord tire which consists in winding a plurality of superposed plies of cord across a pair of spaced supports with the cords in inclined relation to the supports and each ply angularly related to the adjacent plies, impregnating the cords while holding the supports in fixed relation to one another, removing the holding means and expanding and shaping the cord structure to form a tire carcass, removing the supports and forming the beads, and then covering the carcass and vulcanizing the assembly.

6. In a process of building a band structure for cord tires, the steps comprising laying moist cord across a pair of parallel spaced bead supports, treating the cord to remove the moist material therefrom, applying an agent to open the pores of the cord, and then impregnating the cord.

7. In a process of building a cord tire band structure, the steps which comprise laying moist cords across a pair of parallel spaced bead supports, treating the cords to remove the moist material therefrom, and then impregnating the cords.

8. The process of making cord band structure for tires which comprises winding moist cord about a pair of substantially coaxial annular bead supports, rotating said supports relatively to impart the desired angularity to the cords, drying the cords, and then impregnating the same.

9. The process of making cord band structure for tires which comprises winding moist cord about a pair of substantially coaxial annular bead supports, removing the moist material from the cords, and then impregnating the cords.

10. The method of producing a cord structure for tires, in which the cord structure is supported by rings, which comprises supporting the rings in parallel spaced relationship with their axes substantially coincident, winding moist cord about such rings in a continuous spiral in which the cords are juxtaposed, thereafter drying and impregnating the cords and placing them in the positions to be assumed in the finished tire.

11. The method of forming a two-ply, flat band cord structure sustained by bead supports, which comprises holding the bead supports in parallel spaced relation with their axes substantially coincident, then winding said supports with moist cord to form a two-ply band in which the portions of the cords forming the plies are in closely juxtaposed spiral relationship, and thereafter drying and impregnating the cords with rubber compound.

12. The method of forming a two-ply, flat band cord structure sustained by bead supports, which comprises holding the bead supports in parallel spaced relation with their axes substantially coincident, then winding said supports with moist cord to form a two-ply band in which the portions of the cords forming the plies are in closely juxtaposed parallel relationship, then producing relative rotation of said supports to increase the spiral angularity of the cords, and thereafter drying and impregnating the cords with rubber compound.

13. The method of forming a two-ply, flat cord structure sustained by bead supports, which comprises holding the bead supports in parallel spaced relation with their axes substantially coincident, then winding said supports with cord containing at least five percent of moisture, to form a two-ply band in which the portions of the cords forming the plies are in closely juxtaposed parallel relationship, producing relative rotation of said supports to impart the desired angularity to the cords, drying the cords, applying an agent to the cords to assist impregnation thereof, and thereafter impregnating the cords with rubber compound.

14. In a process of building a band structure for cord tires, the steps comprising laying moist cords across a pair of parallel spaced bead supports, applying an agent to open the pores of the cords, and then impregnating the cords.

15. The method of building a pneumatic tire carcass, which consists in laying moist cord across two spaced parallel bead rings coated with rubber and lubricant and designed to remain in the finished tire, drying and impregnating the cord, expanding and shaping the carcass; and then covering and vulcanizing the same.

16. The method of building a pneumatic tire carcass, which consists in laying cord across two spaced parallel bead supports coated with rubber and lubricant and designed to form the bead rings in the finished tire, treating the cords with an agent to open the pores and facilitate impregnation of the same with rubber, and then impregnating, expanding and shaping the cords to form a carcass.

CHARLES W. McKONE.